United States Patent [19]

Kawazoe et al.

[11] 4,281,821

[45] Aug. 4, 1981

[54] METHOD OF CONTROLLING THE SUCTION GAS PRESSURE OF A SULFURIC ACID PLANT FOR TREATMENT OF SMELTER EXHAUST GAS

[75] Inventors: Masayuki Kawazoe; Yasuro Tomoda, both of Niihama; Atsuo Sasaki, Yokohama; Isao Kaneko, Sagamihara, all of Japan

[73] Assignee: Sumitomo Metal Mining Co., Ltd., Tokyo, Japan

[21] Appl. No.: 80,507

[22] Filed: Oct. 1, 1979

[30] Foreign Application Priority Data

Oct. 7, 1978 [JP] Japan .............................. 53/123796

[51] Int. Cl.³ ..................... B01D 49/00; C01B 17/72; C22B 1/06
[52] U.S. Cl. ........................................ 266/44; 55/106; 55/212; 75/6; 75/74; 165/16; 266/78; 266/144; 266/157; 422/111; 422/112; 422/116; 423/187; 423/210; 423/522
[58] Field of Search ............................. 75/6–9, 75/72–76; 266/44, 144, 156, 157, 78, 89; 423/242–244, 522–538, 210; 55/212, 220, 101, 106, 122; 422/110–112, 161, 168, 187; 98/33 R; 165/16

[56] References Cited

U.S. PATENT DOCUMENTS

| 3,063,219 | 11/1962 | Copeutt | 55/344 |
| 3,348,912 | 10/1967 | Porath et al. | 423/522 |
| 3,443,896 | 5/1969 | Furkert et al. | 423/533 |
| 3,841,615 | 10/1974 | Delaire | 266/44 |
| 4,088,742 | 5/1978 | Homme, Jr. | 423/533 |

*Primary Examiner*—Michael L. Lewis

[57] ABSTRACT

In a system wherein exhaust gases containing $SO_2$ are fed to a sulfuric acid plant from multiple furnaces, including an intermittently operated furnace (such as a copper or nickel converter furnace), a method of automatically controlling the gas pressure to within a predetermined range at a point just upstream of the exhaust gas pretreating equipment at the inlet of the sulfuric acid plant so as to compensate for the fluctuation in the exhaust gas pressure resulting from start up and stopping of the operation of the intermittently-operated furnace. By this method, the disadvantages caused by large gas fluctuations, i.e., the leakage of $SO_2$-containing gas and the suction of excess free air can be prevented.

2 Claims, 8 Drawing Figures

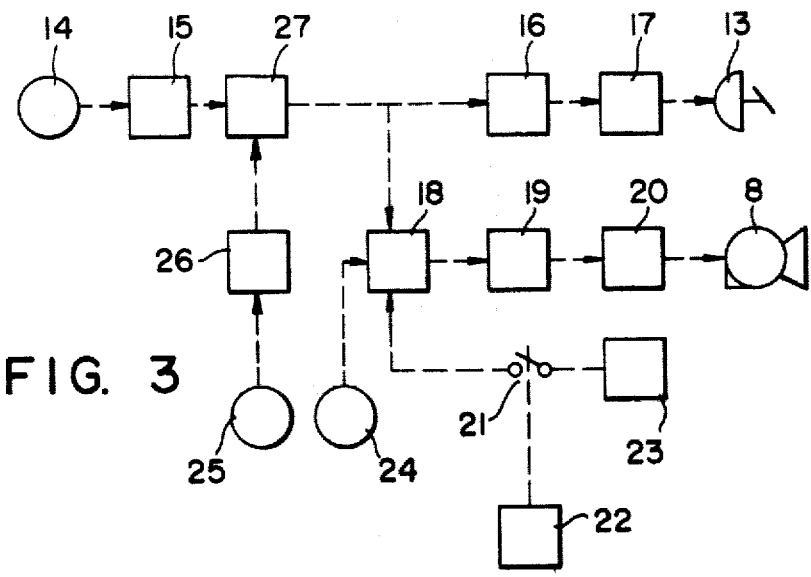
FIG. 3
FIG. 4A
START OF THE FURNACE
WHILE THE SMELTING FURNACE IS BEING BLOWN
WHILE THE CONVERTER FURNACE IS BEING BLOWN
FIG. 4B
EXHAUST GAS AMOUNT VARIATION
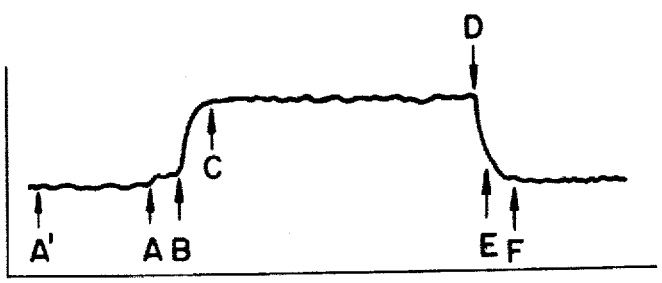

MAIN BLOWER SPEED

MAIN BLOWER INLET DAMPER OPENING

GAS CLEANING EQUIPMENT INLET PRESSURE

METHOD OF CONTROLLING THE SUCTION GAS PRESSURE OF A SULFURIC ACID PLANT FOR TREATMENT OF SMELTER EXHAUST GAS

BACKGROUND OF THE INVENTION

1. Field of the Invention

This invention relates to a method of controlling the flow of combined exhaust gases containing $SO_2$ from a smelting furnace and a converter furnace to a sulfuric acid plant, the smelting furnace being in continuous operation and the converter furnace in intermittent operation, and more particularly to a method of minimizing the gas pressure fluctuations as the gases pass into the sulfuric acid plant.

2. Description of the Prior Art

In the smelting of copper or nickel, there is usually employed a smelting furnace, e.g., a blast furnace, a reverberatory furnace or a flash smelting furnace, for the melting of the input ores to produce a matte rich in copper or nickel. As the ores, flux and fuel are continuously fed to the smelting furnace, and as air or oxygen-enriched air containing the required amount of oxygen is continuously supplied so as to smelt the ores, a substantially constant amount of exhaust gases containing $SO_2$ will be generated. The amounts of these exhaust gases produced during operation will fluctuate very little, unless some external factor comes into play.

On the other hand, in a converter furnace operation for copper or nickel, as the steps of the matte charging, slag formation, and blister copper or finished matte product discharging are repeated, air will be frequently supplied to the converter furnace and then stopped. Accordingly, the generation of exhaust gases containing $SO_2$ will be repeatedly started and stopped, and, in the case of a copper converter furnace, the amount of exhaust gases generated per unit time will substantially correspond to the amount of exhaust gases generated in the smelting furnace.

The total amount of exhaust gases generated in such smelting and converter furnaces must be led to and treated in a sulfuric acid plant. However, if the amount of suction gases is too little, gas will leak out of the treatment apparatus to cause a pollution, whereas if the suction amount is excessive, gas leakage will not be occurred, but excess free air will be sucked in to unnecessarily dilute the $SO_2$-containing gases, and not only will excess power be required but also the operation of the sulfuric acid plant will detrimentally affected.

Particularly in the situation wherein the operation of the converter furnace is intermittent, at the point in time when the operation is started and stopped, the gas pressure within the system will sudddenly fluctuate very drastically due to the large variation in the amount of exhaust gases emitted therefrom. Therefore, as a conventional operating method, a procedure is followed wherein as the amount of exhaust gases fluctuates greatly, the rotational speed of the main blower of the sulfuric acid plant will be elevated or lowered by a manual operation in advance and the damper opening in the blower will be manually adjusted so as to compensate in advance for the coming fluctuation. In another method, as described in Japanese Patent Publication No. 9164/77 Published on Mar. 14, 1977, entitled "Method of Controlling Gas Pressures in Copper Converter Furnace Steps," the fluctuation in the gas amounts of exhaust gases being led to the sulfuric acid plant is compensated for by changing the set pressure valve as the pressure suddenly fluctuates, while automatically controlling the gas pressure. However, with the adjustment of the rotation speed of the main blower in the first method, the response time is so delayed that, in the case of a sudden fluctuation in the gas pressure, too much time is required to compensate for the fluctuation, and at the same time with the adjustment of the opening of the damper at the inlet of the main blower by manual action, a fine adjustment will be difficult to make and the temporary leakage of gas or the suction of excess air cannot be prevented. Even when the second-mentioned method is used, a larger pressure fluctuation will occur in the entire system. Thus, the prior art methods have undesirable defects which affect the stability of the operation of each furnace, as well as the operation of the sulfuric acid plant.

SUMMARY OF THE INVENTION

An object of the present invention is to provide a method wherein during the operation of a sulfuric acid plant which is fed by exhaust gases from an intermittently operated furnace, i.e., a copper or nickel converter furnace, the gas pressure fluctuations in the amount of exhaust gases containing $SO_2$ fed thereto which can cause either leakage of $SO_2$-containing gas or the suction of excess free air can be minimized by controlling within a predetermined range the gas pressure at a point just upstream of the exhaust gas pretreating equipment at the inlet to the sulfuric acid plant, and without changing the set value, by automatically responding to the gas pressure at the points in time when the operation of the converter furnace is started and stopped.

Further objects, advantages and features of the present invention will become more fully apparent from a detailed consideration of the arrangement and construction of the constituent parts as set forth in the following specification taken together with the accompanying drawings.

BRIEF DESCRIPTION OF THE DRAWINGS

In the drawings,

FIGS. 2 and 3 are diagrams showing embodiments of the control circuit for the system of FIG. 1;

FIGS. 4A–E are diagrams showing the state of the furnace, actual exhaust gas amount, main blower speed, main blower inlet damper opening and gas cleaning equipment inlet pressure as a variation in operational status when the control circuit of FIG. 2 is used in the system of FIG. 1.

DETAILED DESCRIPTION OF THE PREFERRED EMBODIMENTS

Figure 1:
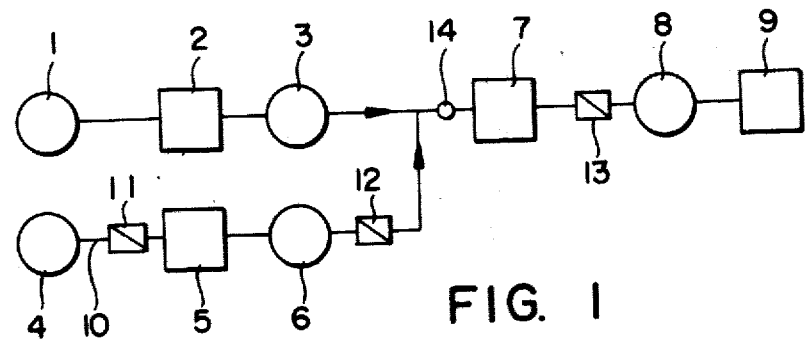
FIG. 1 is a system diagram showing an embodiment of the present invention.
Figure 2:
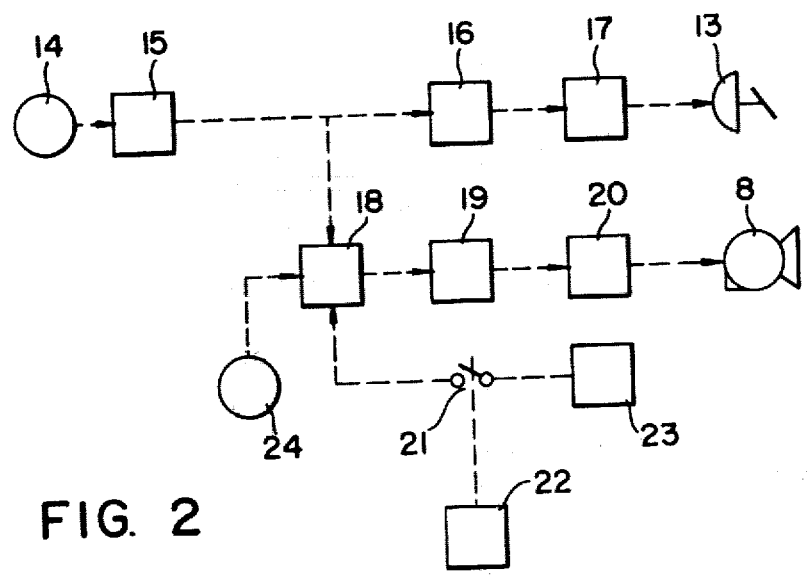

In FIG. 1, which represents a system diagram showing an embodiment of the present invention, and in FIG. 2, which shows an embodiment of the control circuit for the FIG. 1 system, a blower 1 feeds air to a smelting furnace 2, such as a flash smelting furnace, and an exhaust fan 3 leads the generated exhaust gases away from the smelting furnace and ultimately to a sulfuric acid plant. The smelting furnace 2 is always charged with ores and fuel and exhausts a substantially fixed amount of gases. On the other hand, a converter furnace blower 4 blows air into a converter furnace 5, and the exhaust gases generated in the converter 5, which contain $SO_2$, are sucked and led by a converter furnace exhaust fan 6 to join with the exhaust gases from the smelting furnace 2, which combined gases are then sent to a sulfuric acid-producing system 9 via sulfuric acid plant inlet gas cleaning equipment 7 and a sulfuric acid plant main blower 8. In the diagram, the arrows indicate the direction of the gas flow.

According to the present invention, a blower dampler 11 is placed within the air-feeding pipe 10 which connects the blower 4 with the converter furnace 5, a delivery side damper 12 is placed immediately downstream of the converter furnace exhaust gas fan 6, a main blower inlet damper 13 is placed immediately upstream the sulfuric acid plant main blower 8, and a gas pressure transmitter 14 is placed immediately upstream of the sulfuric acid plant inlet gas cleaning equipment 7. At the location of this gas pressure transmitter 14, the pressure will fluctuate greatly at the time of start up or stopping of the converter furnace 5, i.e., due to great variation in the amounts of gas joining together upstream of the transmitter 14 from the converter furnace 5 and the smelting furnace 2.

Therefore, in order to control the gas pressure at the point where the exhaust gases from both furnaces join, such that it will remain at a fixed value, so as to avoid the conventionally experienced large fluctuations in pressure, the rotational speed of the sulfuric acid plant main blower 8 and the degree of the opening in the main blower inlet damper 13 are together adjusted by the control circuit shown in FIG. 2.

In FIG. 2, a gas pressure transmitter 14, which is located immediately upstream of the sulfuric acid plant inlet gas cleaning equipment 7 as shown in FIG. 1, is depicted, together with a gas-pressure regulator 15, a main blower inlet damper ratio setter 16, a main blower inlet damper operator 17, main blower inlet damper 13 (as in FIG. 1), a signal adder 18, a main blower ratio setter 19, a main blower speed controller 20, a main blower 8 (as in FIG. 1), a switch 21, a limit switch 22 (located on the delivery side of damper 12), a fixed signal transmitter 23, and a converter furnace blower flow volume transmitter 24.

According to the present invention, at the time of start up and stopping of the operation of the converter furnace, the gas pressure will be automatically detected and controlled by a stepwise operational sequence. In sequential order of operation, this stepwise action can be explained with reference to FIGS. 1 and 2.

(A) Converter furnace operation starting up

At the time of start up of the converter furnace operation, as the blower damper 11 and delivery side damper 12 are closed, the operation of the converter furnace blower 4 and converter furnace exhaust gas fan 6 will be started, and the speed of the exhaust fan 6 will be increased to the speed for the normal operation of the converter furnace 5; at this point, the delivery side damper 12 will be fully opened, and then the blower damper 11 will be opened so as to begin the blowing of air through converter furnace 6. During this sequence, and at the point in time when the delivery side damper 12 is detected as being half opened via the delivery side damper limit switch 22, the switch 21 will be on and the bias signal, preset by the fixed signal transmitter 23, will be added to the output signal of the gas pressure regulator 15 by the signal adder 18, so as to increase the speed of the main blower 8 (due to the bias signal part of the total signal) via the main blower ratio setter 19 and main blower speed regulator 20.

At this time, the gas pressure on the inlet side of the gas cleaning equipment 7 will quickly change to a negative value and the gas pressure transmitter 14 will emit negative signals. However, this fluctuation in the gas pressure will be compensated for by reducing the degree of the opening of the main blower inlet damper 13, i.e., via operation of the main blower inlet damper ratio setter 16 and the main blower inlet damper operator 17. When the delivery side damper 12 becomes fully open, the blowing of air through the converter furnace 5 starts and the amount of exhaust gas will begin to quickly increase, while the degree of the opening of the main blower inlet damper 13 remains reduced, such that the above-mentioned inlet gas pressure will quickly change to a positive value. At this point gas pressure transmitter 14 will emit positive signals and, as mentioned above, the degree of the opening of the main blower inlet damper 13 will be made larger. Thus, the fluctuation in the gas pressure will be compensated for. It should be noted that even during the continuous blowing of the converter furnace 5, the amount of air blown therethrough will increase or decrease to some extent and the inlet pressure of the gas cleaning equipment 7 will concurrently fluctuate to some extent. The flow volume of blown air through the converter furnace 5 may be converted to a blowing amount signal by using the transmitter 24, and this signal may be added to the signal adder 18 in order to adjust the rotational speed of the main blower 8. In this case, too, the quickly responsive main blower inlet damper 13 will be effectively operated by the signal of the inlet gas pressure transmitter 14 of the gas cleaning equipment 7.

(B) Converter furnace operation stopping

At the time of stopping of the operation of the converter furnace 5, as the blower damper 11 is first closed so as to stop the blowing of air through the converter furnace 5, the generation of the exhaust gases of the converter furnace 5 will stop. Therefore, with rotation of the converter furnace exhaust gas fan 6 remaining unchanged, the delivery side damper 12 is closed.

At this time, the gas pressure on the inlet side of the gas cleaning equipment 7 will suddenly change to a negative value and the gas pressure transmitter 14 will emit negative signals. Therefore, as described above, the degree of the opening of the main blower inlet damper 13 will be quickly adjusted to a smaller degree to compensate for the negative pressure. When the delivery side damper 12 is half closed, the delivery side damper limit switch 22 will operate to open the switch 21, the bias signal sent from the fixed signal transmitter 23 will be removed, and therefore the speed of the main blower 8 will be greatly reduced. When the delivery side damper 12 is completely closed and the sucked gases on the converter furnace side are entirely eliminated, while the opening of the main blower inlet damper 13 remains at a smaller degree, the inlet pressure of the gas cleaning equipment 7 will become positive and the opening of the main blower inlet damper 13 will then be made larger to compensate for the fluctuation in the pressure.

Figure 4C:
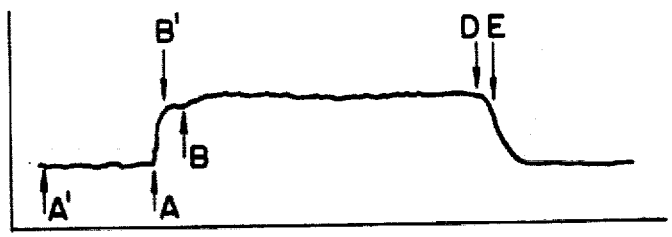
Figure 4D:
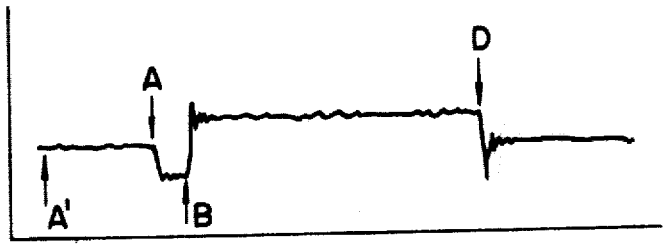
Figure 4E:
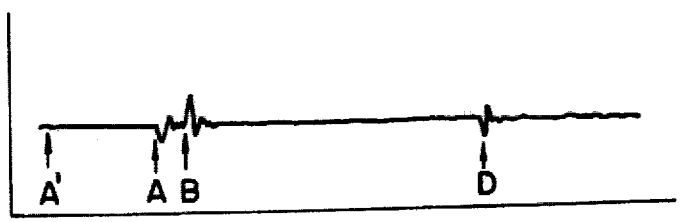

The variations in the speed of the main blower 8 and the opening of the inlet damper 13 at the time of starting up and stopping of the operation of the converter furnace shall be explained with reference to FIG. 4. In the diagram, there are shown respective points in operation:

in FIG. 4A the furnaces 2 and 5 are in operation; in FIG. 4B the variation in the relative exhaust gas amount, led to the gas cleaning equipment 7, is shown, in FIG. 4C the relative speed of the main blower 8 is shown; in FIG. 4D the relative opening of the main blower inlet damper 13 is shown; and in FIG. 4E the relative variation in the inlet pressure of the gas cleaning equipment 7 is depicted. In these Figures, A is the point in time when the delivery side damper 12 is half opened; B is the point in time when the converter furnace blower damper 11 is fully opened, that is, at the start up in the operation of the converter furnace; D is the point in time when the converter furnace blower damper 11 is completely closed, that is, when the operation of the converter furnace is stopped; and E is the point in time when the converter furnace exhaust gas fan delivery side damper 12 is completely closed.

In FIG. 4B, the curve between A'-A represents the regular exhaust gas amount from the smelting furnace 2; the curve between A-B represents the exhaust gas amounts as the converter furnace exhaust fan delivery side damper 12 is opened, some free air being added; the curve between B-C represents the amount after the damper 12 is opened, the exhaust gas amount quickly increasing; the curve between C-D shows the total gas amount flow from both the converter furnace 5 and the smelting furnace 2; the curve between D-E shows the total amount will quickly decrease when the converter furnace is stopped; and at point F, only the exhaust gases from the smelting furance 2 are indicated (and remaining constant). Meanwhile, the speed of the main blower 8 will vary so that, as shown in FIG. 4C, at the time point A, the exhaust gas fan delivery side damper limit switch 22 may operate, such that the fan speed will increase when the bias signal is added. At this time, a pressure of the gas cleaning equipment 7 will suddenly change to a negative value, but will be compensated for (See A-B in FIG. 4E) by the adjusting operation of the quickly responsive main blower inlet damper 13, i.e., opening (See A-B in FIG. 4D).

When the exhaust gas amount begins to quickly increase as shown between B-C, the gas pressure of the gas cleaning equipment 7 will accordingly quickly change to a positive value, but will be compensated for (see the change just after the point B in FIG. 4E) by the operation (see the change just after the point B in FIG. 4D) of the quickly responsive main blower inlet damper 13.

After the converter furnace exhaust gas amount increases during the converter furnace operation, the signal from the blowing flow volume transmitter 24 to the converter furnace will be also added to the output of the gas pressure regulator 15 by the signal adder 18 to adjust the speed of the main blower 8. Also, at the time of stopping the operation of the converter furnace, an action reverse to the action at the time of starting the operation will be made.

Thus, there are effects that, by the method wherein the sulfuric acid plant main blower speed is increased in advance before starting the converter furnace operation, so that a quick pressure fluctuation may be quickly responded by adjusting the opening of the main blower inlet damper 13, the inlet pressure of the gas cleaning equipment 7 at the inlet of the sulfuric acid plant can be maintained to a nearly constant value without changing the set value as in the conventional method, as shown in FIG. 4E, and a quick fluctuation in the above-mentioned pressure with the fluctuation of the exhaust gas amount can be controlled to be within an allowable value.

It should be noted that the gas cleaning equipment of the above-described embodiment is usually provided in a system in which a fluctuation in the pressure of higher than a predetermined value must not be exceeded, as when a wet process electrostatic precipitator is used. In such system, as shown in FIG. 3, a gas transmitter 25 within such system which must be protected from an overload pressure (as when an electrostatic precipitator is used) may be utilized so that, in case the internal pressure either positively or negatively exceeds a set allowable pressure range, a signal may be generated from the transmitter and a positive or negative signal may be added to the output of the gas pressure regulator 15 in the circuit shown in FIG. 2 by a special function generator 26 and signal adder 27 to protect the above-mentioned system from the excess pressure load.

As previously explained in detail, according to the method of control of the present invention, and as compared to a conventional method wherein a set pressure value is manually or automatically externally changed, the achievement of a set pressure value can be obtained, and a stabilized pressure balance can be always kept in the gas leading system (i.e., via the concurrent use of a quickly responsive value opening of the damper and a controlling of the speed of the main blower); therefore, a sudden change in the gas pressure can be easily compensated for, and a system which may value as its weak point the necessity of maintaining a constant pressure load (such as in a system using wet process electrostatic precipitator) can be safely protected.

While the present invention has been described with reference to particular embodiments thereof, it will be understood that numerous modifications may be made by those skilled in the art without actually departing from the spirit and scope of the invention as defined in the appended claims.

We claim:

1. In a system which includes an intermittently operating converter furnace, a constantly operating smelting furnace, a sulfuric acid-producing stage, a converter furnace exhaust gas flue for leading exhaust gases from the converter furnace away therefrom via a converter furnace exhaust gas fan, a smelting furnace exhaust gas flue for leading exhaust gases from the smelting furnace away therefrom via a smelting furnace exhaust gas fan, wherein said exhaust gas flues join together and a further gas flue leads to generated exhaust gases, sequentially through a gas-cleaning stage, a sulfuric acid plant main blower, and onto said sulfuric acid-producing stage, wherein a first damper is provided in the converter furnace exhaust gas flue between the converter furnace exhaust gas fan and the location where said exhaust gas flues join together, wherein a second damper is provided in the further gas flue between the gas-cleaning stage and the sulfuric acid plant main blower, and wherein a gas pressure transmitter is located on the further gas flue between the location where said exhaust gas flues join together and said gas-cleaning stage, the method of controlling the suction gas pressure in said further gas flue such that the rotation speed of the sulfuric acid plant main blower and the degree of the opening of the second damper are controlled automatically so as to maintain a predetermined value by signals from the gas pressure control unit wherein:

(A) When the converter furnace operation is commenced, in sequence: the first damper is opened, the rotational speed of the sulfuric acid plant main blower is increased, the degree of the opening in the second damper is reduced such that the gas pressure in the further gas flue between the location where the exhaust gas flues join together and the gas-cleaning stage will maintain a constant value, the blowing of air through the converter furnace is started, the degree of the opening in the second damper is made larger such that an increase in the gas pressure in said further gas flue will be compensated for and be maintained at a predetermined value, and the degree of the opening in the second damper and the rotation speed of the sulfuric acid plant main blower are controlled so as to maintain a predetermined gas pressure in the further gas flue when both the converter furnace and the smelting furnace are in normal operation, (B) When the converter furnace operation is stopped, in sequence: the degree of the opening in the second damper is reduced such that the gas pressure in said further gas flue will maintain a constant value, when the amount of exhaust gas entering from said converter furnace exhaust gas flue is decreased, the first damper is closed, the rotation speed of the sulfuric acid plant main blower is reduced, the degree of the opening in the second damper is made larger such that an increase in the gas pressure in said further gas flue will be compensated for and be maintained at a predetermined value, and the degree of the opening in the second damper and the rotation speed of the sulfuric acid plant main blower are controlled so as to maintain a predetermined gas pressure in the further gas flue when only the smelting furnace is in normal operation.

2. The method according to claim 1 wherein the gas-cleaning stage includes a wet process electrostatic precipitator and wherein the degree of the opening on the second damper and the rotation speed of the sulfuric acid plant main blower is controlled so that the gas pressure in electrostatic precipitator does not exceed a predetermined maximum or a predetermined minimum value.

* * * * *